(12) United States Patent
Luo et al.

(10) Patent No.: US 11,426,812 B2
(45) Date of Patent: Aug. 30, 2022

(54) MACHINING APPARATUS AND MACHINING SYSTEM

(71) Applicant: General Electric Company, Schenectady, NY (US)

(72) Inventors: Yuanfeng Luo, Niskayuna, NY (US); Yong Wu, Shanghai (CN); Paolo Mola, Florence (IT); Dragan Filipovic, Garbing b. Munich (DE)

(73) Assignee: General Electric Company, Schenectady, NY (US)

( * ) Notice: Subject to any disclaimer, the term of this patent is extended or adjusted under 35 U.S.C. 154(b) by 234 days.

(21) Appl. No.: 15/762,859

(22) PCT Filed: Sep. 22, 2016

(86) PCT No.: PCT/US2016/053022
§ 371 (c)(1),
(2) Date: Mar. 23, 2018

(87) PCT Pub. No.: WO2017/058623
PCT Pub. Date: Apr. 6, 2017

(65) Prior Publication Data
US 2018/0272449 A1    Sep. 27, 2018

(30) Foreign Application Priority Data

Sep. 28, 2015 (CN) .......................... 201510628251.9

(51) Int. Cl.
*B23H 3/04* (2006.01)
*B23H 7/26* (2006.01)
(Continued)

(52) U.S. Cl.
CPC ............... *B23H 3/04* (2013.01); *B23H 7/265* (2013.01); *B23H 9/10* (2013.01); *B23H 9/14* (2013.01); *B23H 2400/10* (2013.01)

(58) Field of Classification Search
CPC . B23H 3/04; B23H 3/00; B23H 7/265; B23H 7/28; B23H 9/10; B23H 1/04;
(Continued)

(56) References Cited

U.S. PATENT DOCUMENTS 3,247,087 A * 4/1966 Gauthier ................... C25F 3/16
219/69.15
3,402,279 A   9/1968 Sazhin
(Continued)

FOREIGN PATENT DOCUMENTS

CN        1693024 A    11/2005
CN      102019470 A     4/2011
(Continued)

OTHER PUBLICATIONS

SU 512892 translation (Year: 1976).*
(Continued)

*Primary Examiner* — Tu B Hoang
*Assistant Examiner* — Bonita Khlok
(74) *Attorney, Agent, or Firm* — Fitch, Even, Tabin & Flannery LLP

(57) ABSTRACT

A machining apparatus includes a curved outer conduit, a curved rotary electrode and a driving motor. The outer conduit has a cavity and a fluid inlet in fluid communication with the cavity. The electrode includes a flexible shaft positioned in the cavity and having a first end and a second end, and a machining head having a fluid outlet in fluid communication with the cavity and electrically connected with the first end of the flexible shaft to be powered via the flexible shaft. The motor is mechanically coupled to the second end of the flexible shaft for driving the flexible shaft to rotate. A machining system includes the machining apparatus, a power supply for powering the flexible shaft, an electrolyte supply for providing electrolyte to the fluid inlet
(Continued)

and a machine tool onto which the outer conduit and the motor are positioned.

20 Claims, 10 Drawing Sheets

(51) Int. Cl.
    *B23H 9/10*           (2006.01)
    *B23H 9/14*           (2006.01)

(58) Field of Classification Search
    CPC .......... B23H 9/00; B23H 9/006; B23H 1/022;
                 B23H 7/32; B23H 7/08; B23H 9/14–16;
                 B23H 7/105; B23H 7/12; B23H 7/22–24;
                 B23H 5/00–14; B23H 2400/00–10; B23H
                 1/08–10; B23H 3/08–10; B23H 5/10–14;
                 B23K 9/013; C25D 17/10
    USPC ...................... 219/69.15, 69.14, 69.2, 69.17;
                                    205/640–686; 204/224 M
    See application file for complete search history.

(56) References Cited

U.S. PATENT DOCUMENTS

| | | | |
|---|---|---|---|
| 4,827,675 A | 5/1989 | Andrews | |
| 6,225,589 B1* | 5/2001 | Bartok | B23H 7/265 |
| | | | 219/69.15 |
| 8,091,230 B2 | 1/2012 | Bladon et al. | |
| 8,127,444 B2 | 3/2012 | Bladon | |
| 8,206,066 B2 | 6/2012 | Men et al. | |
| 9,548,620 B2 | 1/2017 | Hu et al. | |
| 2007/0256939 A1* | 11/2007 | Wei | B23K 9/013 |
| | | | 205/674 |
| 2010/0129170 A1* | 5/2010 | Wilmot | B23C 3/32 |
| | | | 409/143 |
| 2011/0070096 A1 | 3/2011 | Wei et al. | |
| 2013/0277336 A1* | 10/2013 | Rudgley | B23H 1/00 |
| | | | 219/69.15 |
| 2015/0273602 A1* | 10/2015 | Mukai | B23H 9/16 |
| | | | 204/224 M |

FOREIGN PATENT DOCUMENTS

| | | | |
|---|---|---|---|
| CN | 104755215 A | | 7/2015 |
| EP | 1 593 449 A2 | | 11/2005 |
| GB | 1249436 | * | 11/1969 |
| GB | 1 249 436 A | | 10/1971 |
| JP | H07-51948 A | | 2/1995 |
| SU | 512 892 A1 | | 5/1976 |

OTHER PUBLICATIONS

Bucklow, I.A., and Cole, M., "Spark-machining," Metallurgical Reviews, vol. 14, Issue 1, pp. 103-118 (1969).
International Search Report and Written Opinion issued in connection with corresponding PCT Application No. PCT/US2016/053022 dated Dec. 1, 2016.
First Office Action and Search issued in connection with corresponding CN Application No. 201510628251.9 dated Jan. 11, 2018.
International Preliminary Report on Patentability issued in connection with corresponding PCT Application No. PCT/US2016/053022 dated Apr. 3, 2018.

* cited by examiner

MACHINING APPARATUS AND MACHINING SYSTEM

BACKGROUND

This disclosure relates generally to the field of machining, and more particularly to a machining apparatus and a machining system having the machining apparatus.

In comparison to conventional mechanical machining, electro-erosion machining is more particularly applied for materials having high hardness with higher machining efficiency. As a result, electro-erosion machining techniques such as EAM (Electrical Arc Machining) and ECDM (Electro-Chemical Discharge Machining) are increasingly techniques of choice in the field of high speed roughing, for example.

In an electro-erosion machining apparatus, a straight electrode is usually used for machining a workpiece for "pocketing", "slotting" or other 3D feature machining, and the electrode has to be spun during the machining to avoid local arc damage to the part. However, the straight electrode has many inherent limitations. For example, a straight electrode is generally difficult or impossible to use for curved pockets or curved holes machining, especially for curved pockets or curved holes machining with high curvatures.

BRIEF DESCRIPTION

In one embodiment, the present disclosure provides a machining apparatus. The machining apparatus comprises a curved outer conduit, a curved rotary electrode and a driving motor. The curved outer conduit has a cavity and a fluid inlet in fluid communication with the cavity. The curved rotary electrode comprises a flexible shaft positioned in the cavity and having a first end and a second end, and a machining head having a fluid outlet in fluid communication with the cavity and electrically isolated from the outer conduit and electrically connected with the first end of the flexible shaft to be powered via the flexible shaft. The driving motor is mechanically coupled to the second end of the flexible shaft for driving the flexible shaft to rotate.

In another embodiment, the present disclosure provides a machining system. The machining system comprises a machining apparatus, a power supply, an electrolyte supply and a machine tool. The machining apparatus comprises a curved outer conduit, a curved rotary electrode and a driving motor. The curved outer conduit has a cavity and a fluid inlet in fluid communication with the cavity. The curved rotary electrode comprises a flexible shaft positioned in the cavity and having a first end and a second end, and a machining head having a fluid outlet in fluid communication with the cavity and electrically isolated from the outer conduit and electrically connected with the first end of the flexible shaft to be powered via the flexible shaft. The driving motor is mechanically coupled to the second end of the flexible shaft for driving the flexible shaft to rotate. The power supply is configured for powering the flexible shaft of the curved rotary electrode. The electrolyte supply is configured for providing electrolyte to the fluid inlet. The outer conduit and the driving motor are positioned on the machine tool.

Due to the curved rotary electrode, the machining apparatus and the machining system provided by the present disclosure can machine various parts with curved pockets, curved holes, vanes and other features having high curvatures or complex geometries which are difficult to access by conventional machining with a straight electrode.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
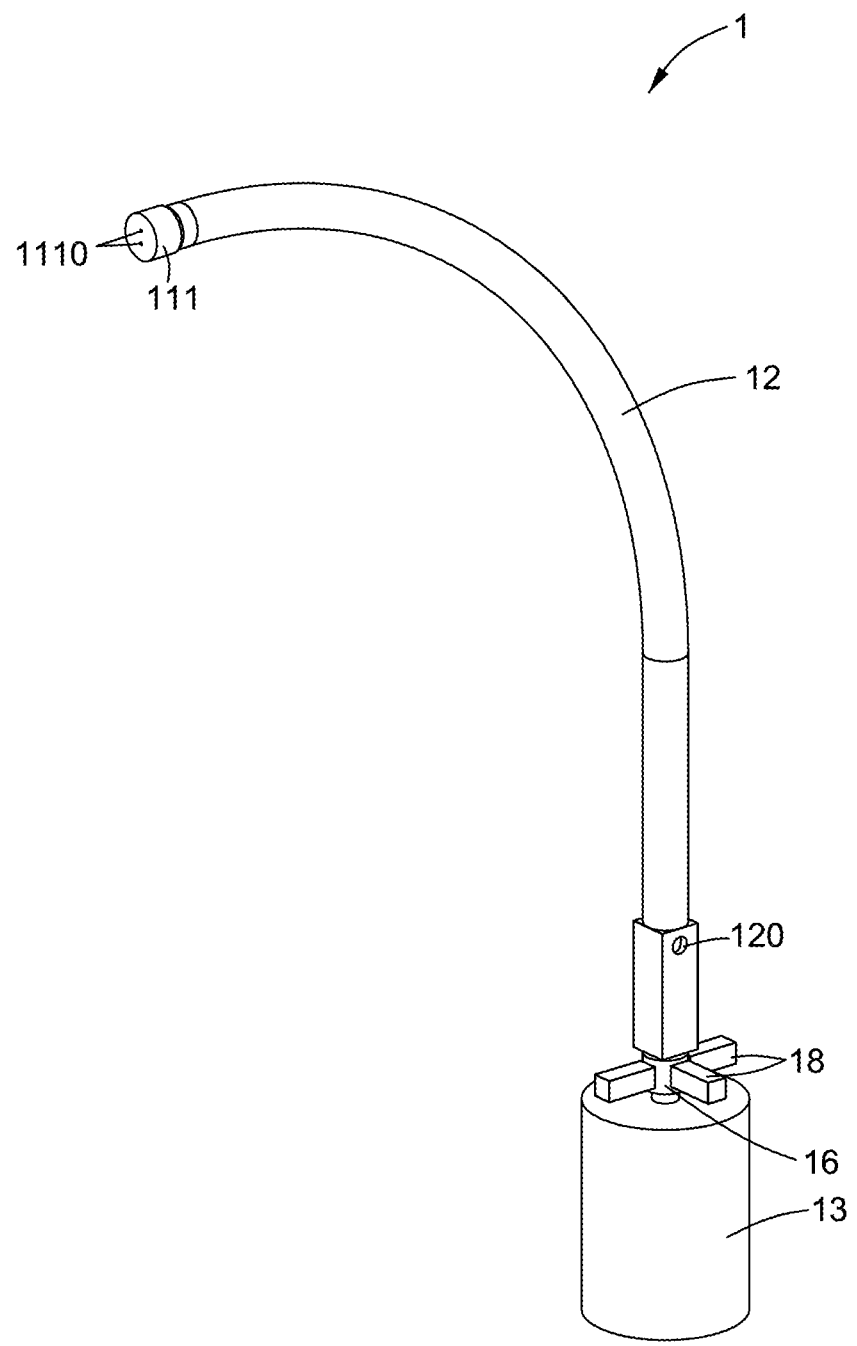
FIG. 1 is a perspective view of a machining apparatus in accordance with an embodiment of the present disclosure.

Embodiments of the present disclosure will be described hereinbelow with reference to the accompanying drawings. In the following description, well-known functions or constructions are not described in detail to avoid obscuring the disclosure in unnecessary detail.

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean either or all of the listed items. The use of "including," "comprising" or "having" and variations thereof herein are meant to encompass the items listed thereafter and equivalents thereof as well as additional items.

FIGS. 1 to 5 illustrate a schematic diagram of a machining apparatus in accordance with an embodiment of the present disclosure. As shown in FIGS. 1 to 5, the machining apparatus 1 in accordance with an embodiment of the present disclosure comprises a curved rotary electrode 11 (shown in FIG. 2), a curved outer conduit 12 and a driving motor 13. The outer conduit 12 has a cavity 10 (shown in FIG. 3) and a fluid inlet 120 in fluid communication with the cavity 10. The curved rotary electrode 11 comprises a machining head 111 and a flexible shaft 112. The flexible shaft 112 is positioned in the cavity 10 and has a first end 1121 (shown in FIGS. 3 and 4) and a second end 1122 (shown in FIGS. 3 and 5). The machining head 111 has a fluid outlet 1110 in fluid communication with the cavity 10 and is electrically isolated from the outer conduit 12 and is electrically connected with the first end 1121 of the flexible shaft 112 so that the machining head 111 may be powered via the flexible shaft 112. The driving motor 13 is mechanically coupled to the second end 1122 of the flexible shaft 112 for driving the flexible shaft 112 to rotate.

When the machining apparatus 1 needs to machine a workpiece, the workpiece is positioned relative to the machining apparatus 1 with the machining head 111 keeping a gap with the workpiece. During machining, the curved rotary electrode 11 is driven to rotate by the driving motor 13 and is moved relative to the workpiece, and the curved rotary electrode 11 and the workpiece are powered by a power supply so that spark discharge is generated between the machining head 111 of the machining apparatus 1 and the workpiece to remove a portion of material of the workpiece. At the same time, fluid is supplied by a fluid supply from the fluid inlet 120 and discharged out of the fluid outlet 1110 of the machining head 111 through the cavity 10 so as to flush the gap between the machining head 111 and the workpiece.

The purpose of rotation of the curved electrode 11 is that the rotary electrode 11 may promote uniform material removal during machining and help to maintain stable machining conditions. Additionally, when a short circuit occurs between the machining head 111 and the workpiece, the rotary electrode 11 may adapt to the short circuit quickly. Because the flexible shaft 112 is positioned in the cavity 10 of the curved outer conduit 12, the flexible shaft 112 is in a curved condition. The purpose of adopting the flexible shaft 112 is to deliver torque when it is such the curved condition.

The outer conduit 12 has enough strength to keep its shape during machining and is also flexible. The outer conduit 12 is electrically isolated from the machining head 111 and is configured not to discharge with the workpiece. Thus, the outer conduit 12 may be metal material. The material of the outer conduit 12 comprises for example copper. But the material of the outer conduit 12 shouldn't be limited to the metal materials. The material of the outer conduit 12 may also comprise electrically insulating materials because the electrically insulating materials may be more helpful to avoid second discharge and avoid damaging the outer conduit 12 due to discharge or electrical arc.

Due to the curved rotary electrode 11, the machining apparatus 1 of the present disclosure can machine various parts with curved pockets, curved holes, vanes or other features having high curvature or complex geometries which are difficult to access by conventional machining with a straight electrode.

Figure 8:
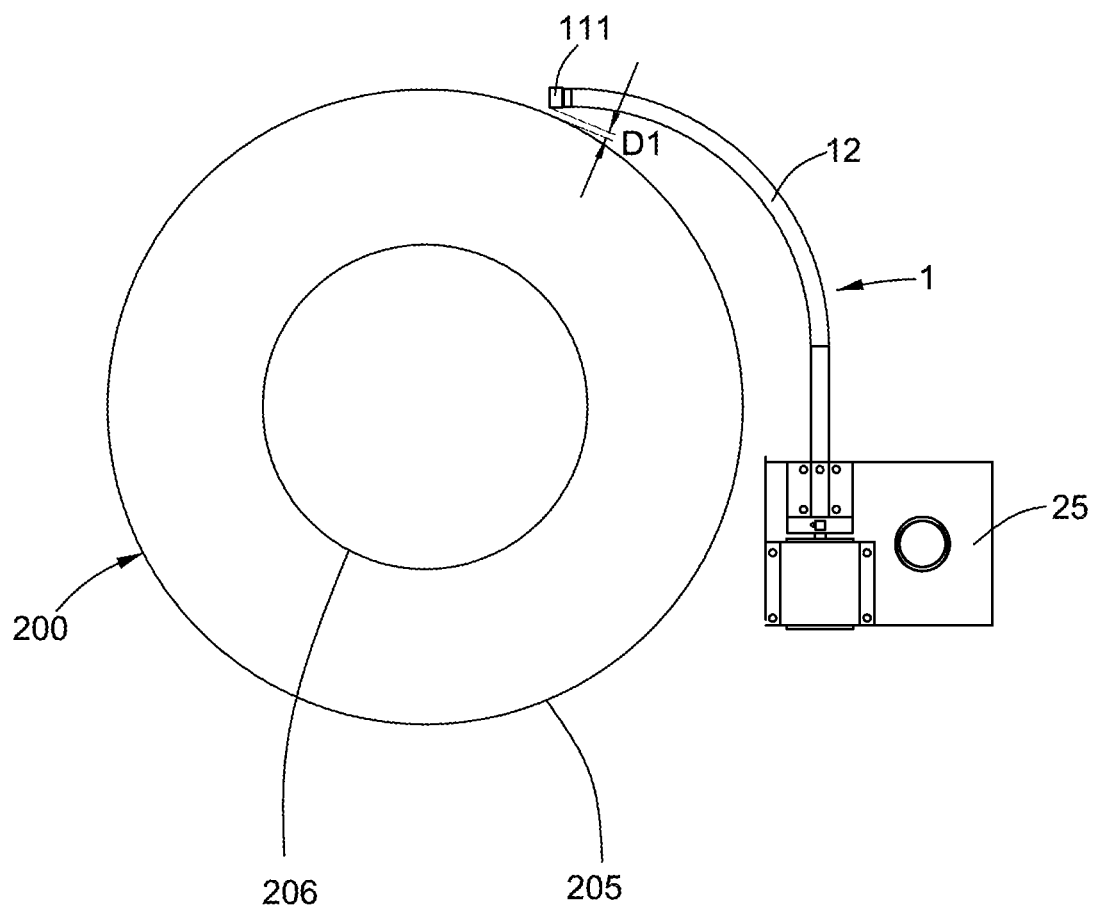
FIG. 8 is a schematic diagram of the machining apparatus of FIG. 7 and a workpiece in a start position of machining.
Figure 9:
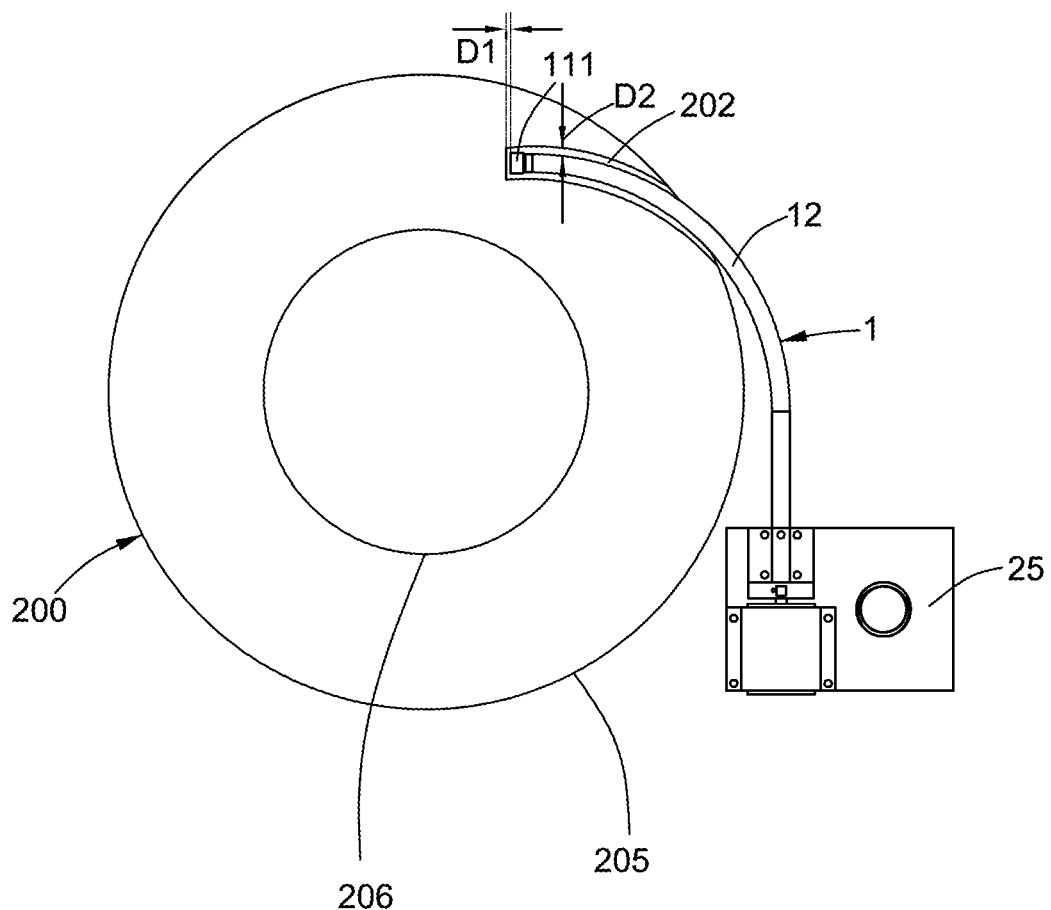
FIG. 9 is a schematic diagram of the machining apparatus of FIG. 7 and the workpiece during machining.
Figure 10:
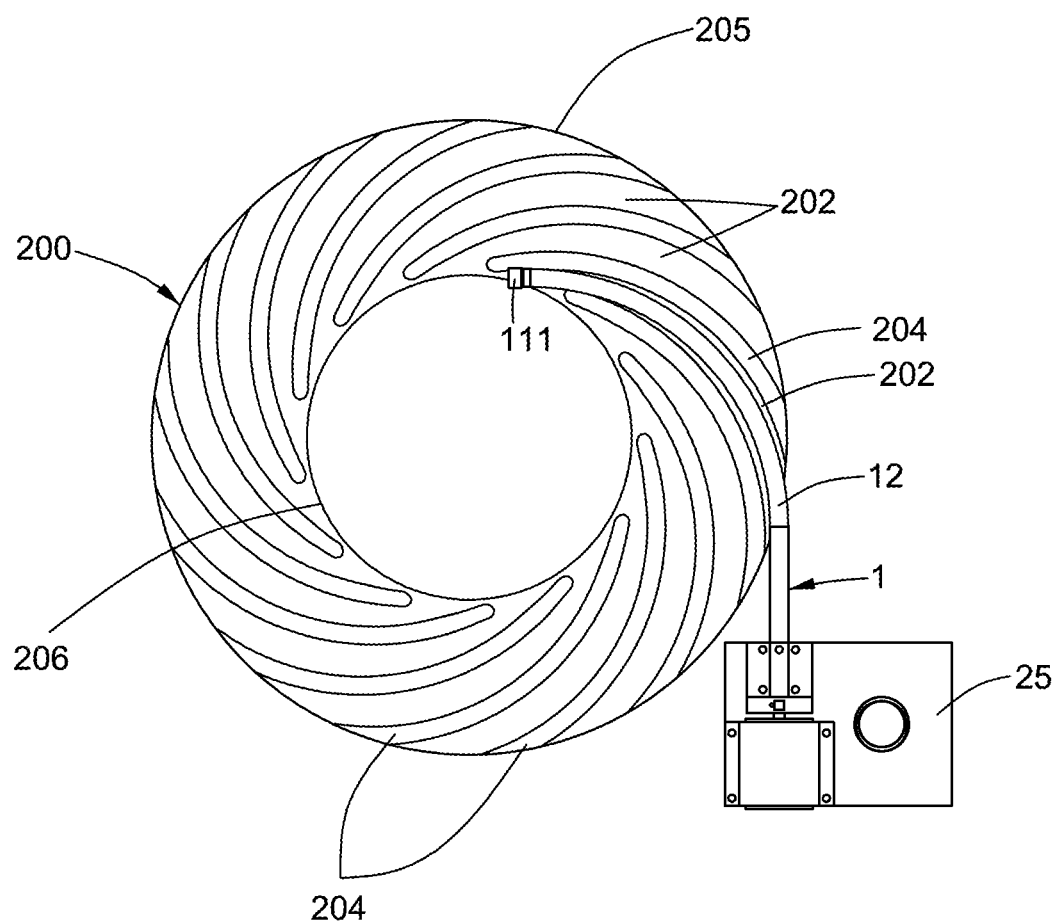
FIG. 10 is a schematic diagram of the machining apparatus of FIG. 7 and the workpiece in a final position of machining.

Because the machining head 111 of the curved rotary electrode 11 is subject to wear during machining a workpiece 200 (as shown in FIGS. 8-10) and it needs to be changed frequently, the machining head 111 is disposed to be replaceable and is detachably coupled to the first end 1121 of the flexible shaft 112. Adopting such the replaceable machining head 111 may facilitate removal of the machining head 111 from the flexible shaft 112 without damaging other parts of the curved rotary electrode 11.

Figure 2:
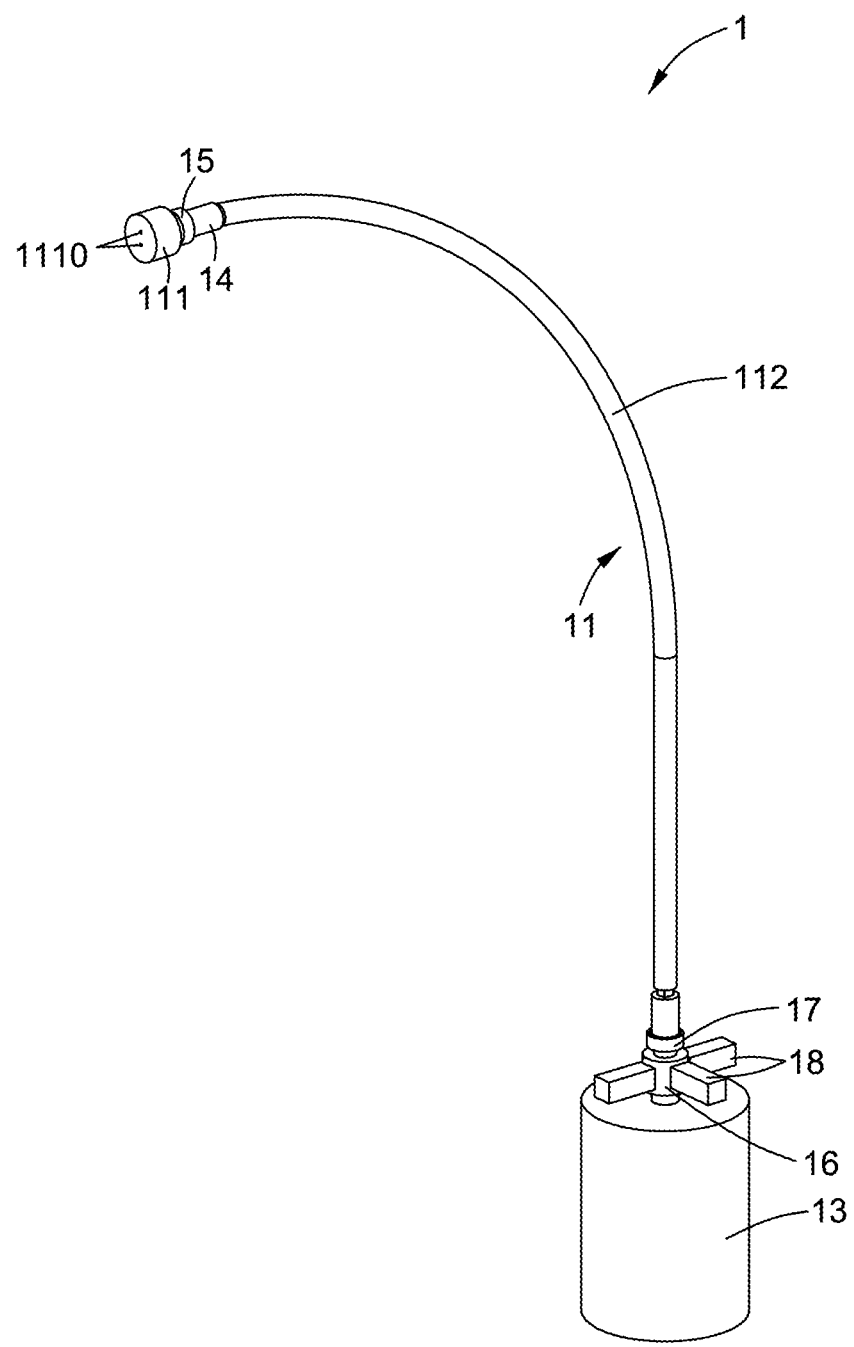
FIG. 2 is a perspective view of the machining apparatus similar to FIG. 1, but an outer conduit of the machining apparatus is removed.
Figure 3:
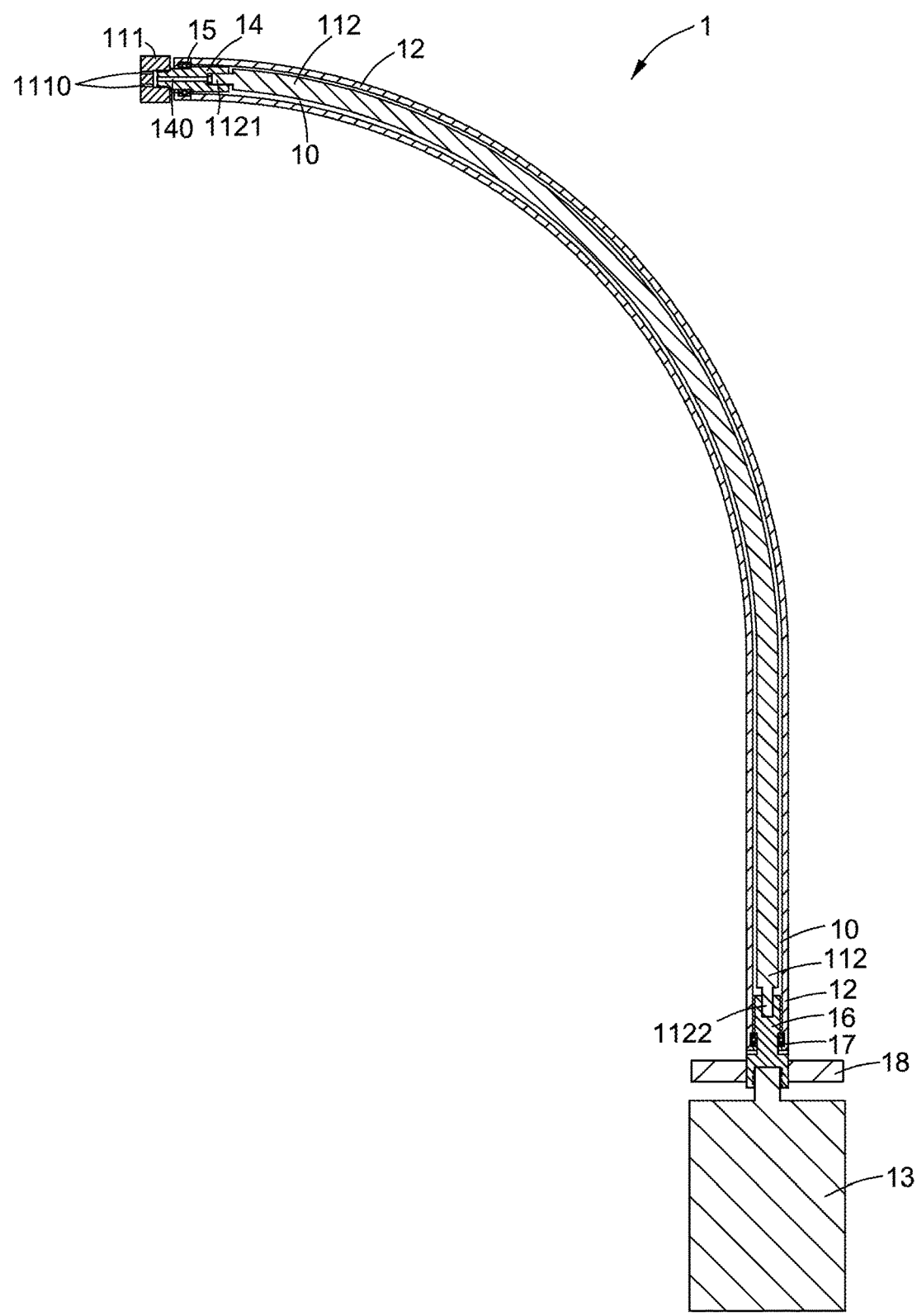
FIG. 3 is a schematic cross-sectional view of the machining apparatus of FIG. 1.
Figure 4:
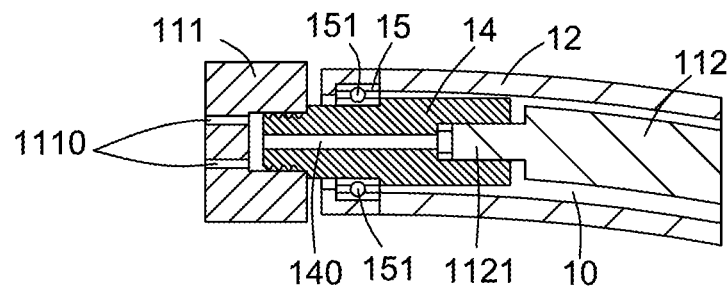
FIG. 4 is an enlarged view of an electrode end of the machining apparatus of FIG. 3.

Referring to FIGS. 2-4, in one embodiment, the machining head 111 of the curved rotary electrode 11 is located outside the outer conduit 12 and the curved rotary electrode 11 may further comprise a first shaft coupling 14 for electrically connecting the machining head 111 with the first end 1121 of the flexible shaft 112. The first shaft coupling 14 comprises a fluid passage 140 in fluid communication with the fluid outlet 1110 and the cavity 10. The machining head 111 of the curved rotary electrode 11 is electrically coupled to the flexible shaft 112 via the first shaft coupling 14, and the machining head 111 is detachably coupled with the first shaft coupling 14. For example, the machining head 111 can be bolted onto the first shaft coupling 14 by a threaded connection and the first end 1121 of the flexible shaft 112 can be inserted into the first shaft coupling 14, so by means of the first shaft coupling 14, the machining head 111 can be detachably coupled to the first end 1121 of the flexible shaft 112.

The machining head 111 of the present disclosure shouldn't be limited to be replaceable. In another embodiment, the machining head 111 may also connect directly and electrically with the first end 1121 of the flexible shaft 112.

The outer conduit 12 is provided with a first bearing 15 within the cavity 10, and the first shaft coupling 14 rotatably contacts with the first bearing 15. The first bearing 15 includes a plurality of roll balls 151. The first shaft coupling 14 can be rotatably coupled with the plurality of the roll balls 151 of the first bearing 15 and the first bearing 15 can be fixed onto the outer conduit 12, so by the means of the first bearing 15, the first end 1121 of the flexible shaft 112 can be rotatably positioned in the cavity 10 of the outer conduit 12.

The first bearing 15 is a sealed bearing for inhibiting fluid from flowing across it. The fluid passage 140 of the first shaft coupling 14 is in fluid communication with the fluid outlet 1110 of the machining head 111 and the fluid passage 140 is also in fluid communication with the cavity 10. Therefore, the fluid can flow to the cavity 10 from the fluid inlet 120 of the outer conduit 12, and then the fluid can further flow to the fluid outlet 1110 of the machining head 111 through the fluid passage 140 of the first shaft coupling 14 from the cavity 10. Because the first sealed bearing 15 is adapted to inhibit fluid from flowing across it, the flow of the fluid is directed out towards a to-be-machined region through the fluid outlet 1110.

Figure 5:
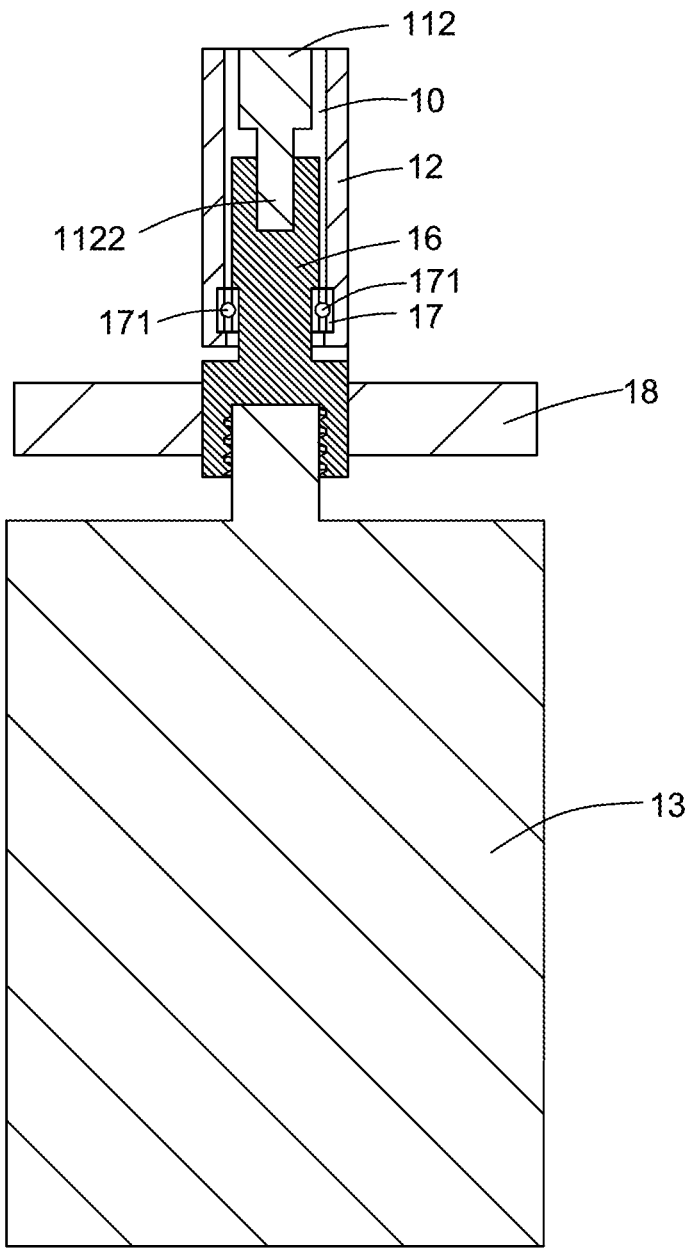
FIG. 5 is an enlarged view of a motor end of the machining apparatus of FIG. 3.

The flexible shaft 112 of the curved rotary electrode 11 is detachably coupled to the driving motor 13. Referring to FIGS. 2, 3 and 5, in another embodiment, the curved rotary electrode 11 may further comprise a second shaft coupling 16 for connecting the second end 1122 of the flexible shaft 112 with the driving motor 13. For example, the driving motor 13 can be bolted onto the second shaft coupling 16 and the second end 1122 of the flexible shaft 112 can be inserted into the second shaft coupling 16, so by means of the second shaft coupling 16, the driving motor 13 can be detachably coupled to the second end 1122 of the flexible shaft 112.

The outer conduit 12 is provided with a second bearing 17 within the cavity 10, and the second shaft coupling 16 rotatably contacts with the second bearing 17. The second bearing 17 includes a plurality of roll balls 171. The second shaft coupling 16 can be rotatably coupled with the plurality of roll balls 171 of the second bearing 17 and the second bearing 17 can be fixed onto the outer conduit 12, so by the means of the second bearing 17, the second end 1122 of the flexible shaft 112 can be rotatably positioned in the cavity 10 of the outer conduit 12.

In one or more embodiments, the second bearing 17 is a sealed bearing, under such circumstance, the fluid can be prevented from flowing outside the cavity 10 via the second bearing 17.

In one embodiment, when the machining apparatus 1 is in operation, in order to prevent one or more electrical wires (not shown in the figures) from being twisted together, the machining apparatus 1 may further comprise one or more positioned carbon brushes 18 electrically connected to a power supply 3 (shown in FIG. 6) via the one or more electrical wires. The second shaft coupling 16 contacts rotatably with the one or more positioned carbon brushes 18. As an example, the machining apparatus 1 is illustrated to comprise three carbon brushes 18. The machining apparatus 1 further comprises resilient components (not shown). The resilient components can keep the three carbon brushes 18 closely contact with the second shaft coupling 16. Because the three carbon brushes 18 electrically contacts with the second shaft coupling 16, the second shaft coupling 16 electrically connects with the second end 1122 of the flexible shaft 112, and the first end 1121 of the flexible shaft 112 electrically connects with machining head 111 via the first shaft coupling 14, the machining head 111 electrically connects with the one or more carbon brushes 18. Thus, the machining head 111 may be electrically connected to the power supply 3 by the one or more carbon brushes 18.

In the present disclosure, the flexible shaft 112 of the curved electrode 11 shouldn't be limited to be powered by the power supply 3 via the second shaft coupling 16 and the one or more positioned carbon brushes 18 above-mentioned and may be electrically connected to the power supply 3 to be powered in any one appropriate manner. For example, in one embodiment, the flexible shaft 112 of the curved electrode 11 may be also directly and electrically connected with the one or more positioned carbon brushes 18 which extend through the outer conduit 12. In another embodiment, the flexible shaft 112 of the curved electrode 11 may be even powered by a wireless power supply.

Figure 6:
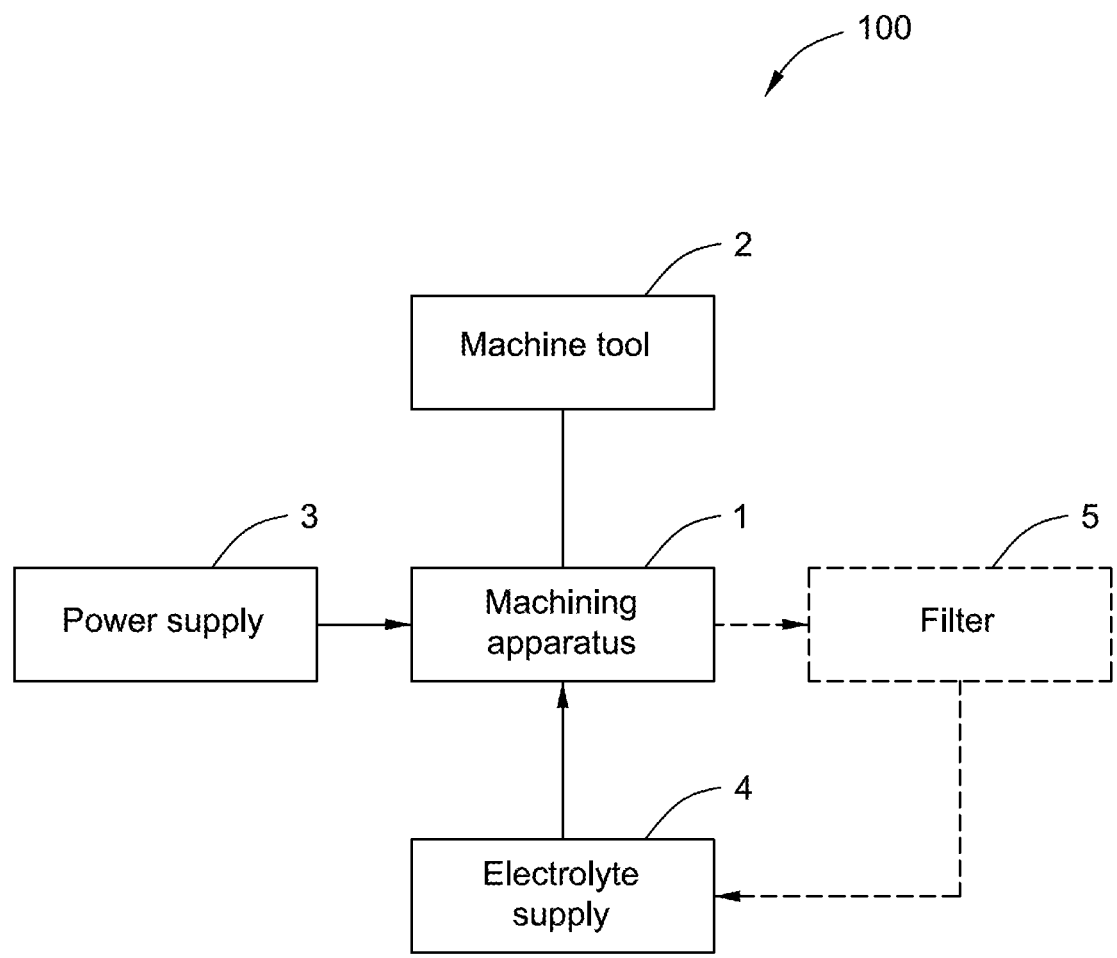
FIG. 6 is a schematic block diagram of a machining system in accordance with an embodiment of the present disclosure.

The present disclosure further provides a machining system 100 for machining a workpiece 200. FIG. 6 illustrates a machining system 100 in accordance with an embodiment of the present disclosure. As shown in FIG. 6, the machining system 100 according to an embodiment of the present disclosure comprises the machining apparatus 1 above-mentioned, a machine tool 2, a power supply 3 and a fluid supply, for example an electrolyte supply 4. The power supply 3 is configured for powering the curved rotary electrode 11 of the machining apparatus 1. The electrolyte supply 4 is configured for providing electrolyte to the fluid inlet 120 of the outer conduit 12 of the machining apparatus 1. The machining apparatus 1 can be mounted onto the machine tool 2.

Figure 7:
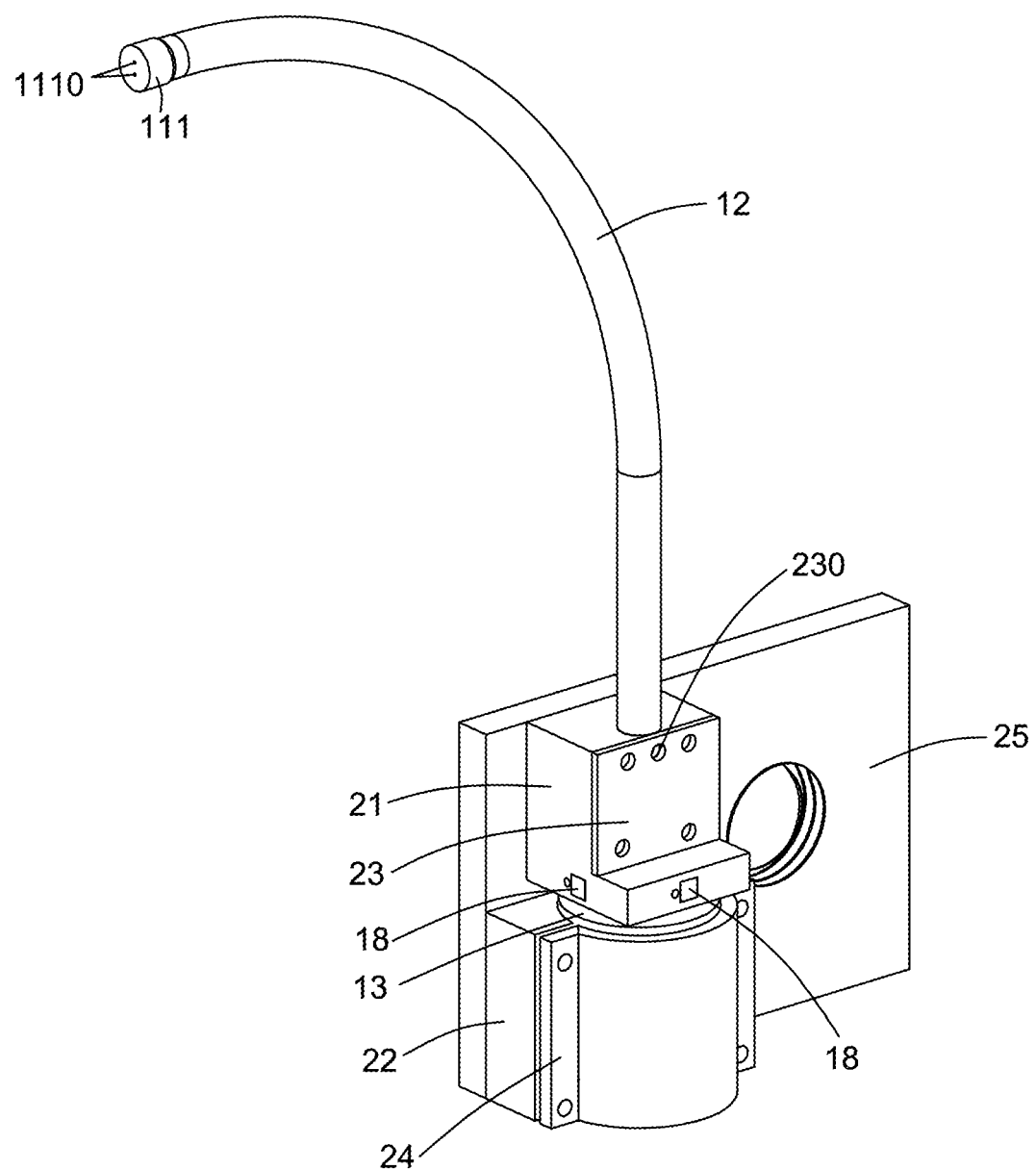
FIG. 7 is a perspective view of the machining apparatus with a mounting plate for connecting to a machine tool.

With reference to FIG. 7, in one embodiment, the machining apparatus 1 may further comprise a first mounting base 21 and a second mounting base 22. The first mounting base 21 and the second mounting base 22 may be separated from each other in order to facilitate mounting the outer conduit 12, the three carbon brushes 18 and the driving motor 13. The outer conduit 12 and the three carbon brushes 18 of the machining apparatus 1 can be placed within the first mounting base 21. The driving motor 13 of the machining apparatus 1 can be placed within the second mounting base 22. Additionally, the machining apparatus 1 may further comprise a first lid 23 corresponding to the first mounting base 21 and a second lid 24 corresponding to the second mounting base 22. The first lid 23 may be connected with the first mounting base 21 for example by bolts. The first lid 23 has an aperture 230 aligning with the fluid inlet 120 of the outer conduit 12. The second lid 24 may be connected with the second mounting base 22 for example by bolts. The first mounting base 21 and the second mounting base 22 can be mounted onto the machine tool 2 by a mounting plate 25. Thus, the outer conduit 12, the three carbon brushes 18 and the driving motor 13 of the machining apparatus 1 may be respectively positioned on the machine tool 2.

The three carbon brushes 18 of the machining apparatus 1 are electrically connected to the power supply 3 via one or more electrical wires. Because the three carbon brushes 18 are electrically connected with the flexible shaft 112 via the second shaft coupling 16, and the flexible shaft 112 is electrically connected with the machining head 111 via the first shaft coupling 14, the machining head 111 of the machining apparatus 1 is indirectly and electrically coupled to the power supply 3.

In one embodiment, the machining apparatus 1 is an electro-chemical discharge machining (ECDM) apparatus, which is configured to roughly machine one or more curved pockets or curved holes 202 in the workpiece 200 (as shown in FIGS. 8-10). For example, the workpiece 200 is generally the shape of annular disk. It will be described in detail below that more curved pockets 202 are roughly machined in the workpiece 200 as an example, which is also applied for more curved holes roughly machined in the workpiece 200.

When the workpiece 200 is needed to be machined, the workpiece 200 is positioned relative to the machining apparatus 1. FIG. 8 illustrates a schematic diagram of the machining apparatus 1 and the workpiece 200 in a start position of machining. Referring to FIG. 8, before machining the workpiece 200, the machining apparatus 1 is positioned near an outer radial edge 205 of the disc-shaped workpiece 200, and the machining head 111 of the machining apparatus 1 is kept a certain gap D1 with the outer radial edge 205 of the workpiece 200.

FIG. 9 illustrates a schematic diagram of the machining apparatus 1 and the workpiece 200 during machining. In order to clearly show one machined pocket 202 in the workpiece 200, a shroud 207 (shown in FIG. 11) of the workpiece 200 is removed. Referring to FIG. 9, when the workpiece 200 is machined, the workpiece 200 and the curved rotary electrode 11 of the machining apparatus 1 are respectively powered by the power supply 3. In one embodiment, the workpiece 200 is coupled to a negative electrode of the power supply 3, and the three carbon brushes 18 are coupled to a positive electrode of the power supply 3 so that the machining head 111 is indirectly coupled to the positive electrode of the power supply 3. In an alternative embodiment, the workpiece 200 may be also coupled to a positive electrode of the power supply 3, and the three carbon brushes 18 may be coupled to a negative electrode of the power supply 3. The electrolyte is provided by the electrolyte supply 4 to the gap D1 between the machining head 111 and the workpiece 200 via the fluid inlet 120 of the outer conduit 12, the cavity 10 and the fluid outlet 1110 of the machining head 111. In this embodiment, the electrolyte is flowed to the fluid outlet 1110 of the machining head 111 through the fluid passage 140 of the first shaft coupling 14 from the cavity 10 and is then supplied to the gap D1 between the machining head 111 and the workpiece 200.

During the machining, the workpiece 200 is moved along a pre-determined machining path relative to the machining head 111 of the machining apparatus 1, and oppositely, the machining head 111 is moved toward an inner radial edge 206 of the workpiece 200 from the outer radial edge 205 of the workpiece 200. At the same time, spark discharge is generated between the machining head 111 of the machining apparatus 1 and the workpiece 200 so that a portion of material of the workpiece 200 is removed to form one curved pocket 202 in the workpiece 200. In another embodiment, the workpiece 200 may be also kept stationary, and instead, the machining apparatus 1 may be moved. The electrolyte is discharged out of the machining head 111 of the machining apparatus 1 to flush the gap D1 between the machining head 111 and the workpiece 200, so debris generated during the machining can be flushed away in time. By flushing of the electrolyte, stability of the machining process can be increased. Furthermore, the electrolyte can be circulated through a radial gap D2 between the machined curved pocket 202 of the workpiece 200 and the machining apparatus 1 from the fluid inlet 120 of the outer conduit 12, the cavity 10 and the fluid outlet 1110 of the machining head 111.

In one embodiment, as shown in FIG. 6, the machining system 100 may further comprise a filter 5. The filter 5 can filter from the electrolyte the debris generated during the machining of the workpiece 200, and the filtered electrolyte can be returned to the electrolyte supply 4 for reuse.

FIG. 10 illustrates a schematic diagram of the machining apparatus 1 and the workpiece 200 in a final position of machining, and the shroud 207 (shown in FIG. 11) of the workpiece 200 is removed in order to clearly show a plurality of curved pockets 202 machined and a plurality of formed blades 204 in the workpiece 200. Referring to FIG. 10, when machining of a curved pocket 202 is finally finished, the machining head 111 of the machining apparatus 1 is arrived at the inner radial edge 206 of the workpiece 200, and the curved pocket 202 extends through the inner radial edge 206 and the outer radial edge 205 of the workpiece 200. After one curved pocket 202 is machined in the workpiece 200, the workpiece 200 is rotated a predetermined angle, and then another curved pocket 202 is machined in the workpiece 200 according to the similar method above so that a blade 204 is formed between adjacent two curved pockets 202 of the workpiece 200. In this way, the plurality of curved pockets 202 are roughly machined one after another in the workpiece 200 so that the plurality of blades 204 are formed in the workpiece 200.

By using the ECDM process, the machining apparatus 1 can machine the plurality of curved pockets 202 in the workpiece 200 using low cutting force, and can reduce roughly-machining time greatly for the plurality of curved pockets 202 in the workpiece 200.

Figure 11:
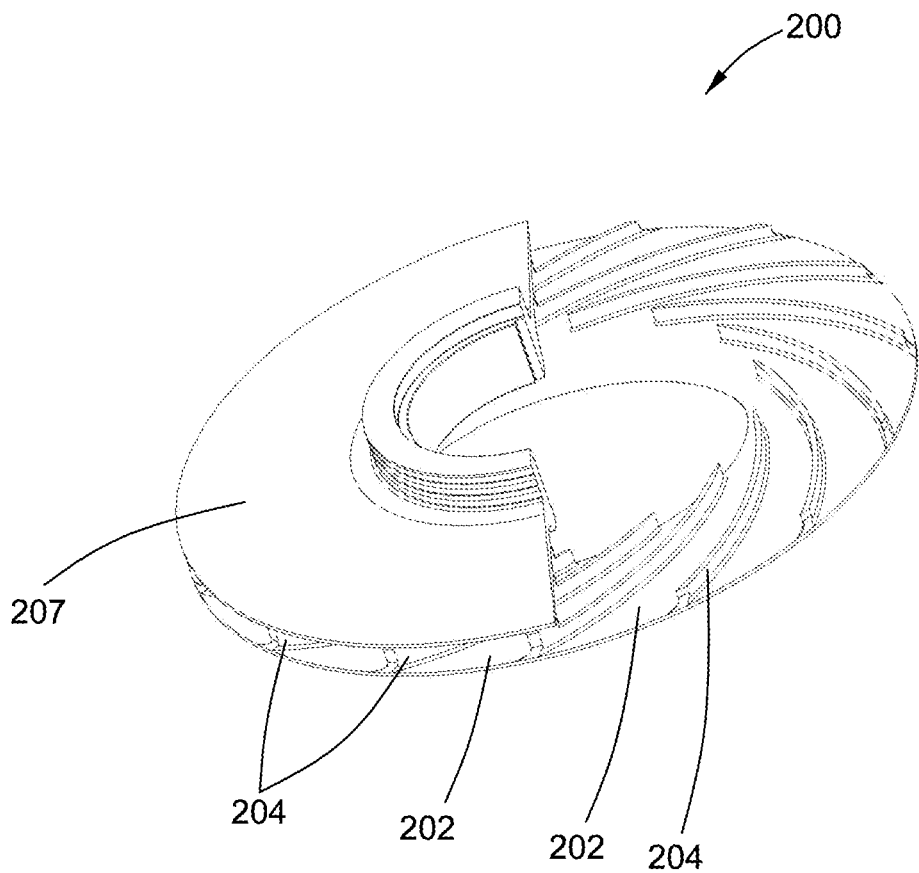
FIG. 11 is a schematic perspective view of a finely-machined workpiece.

FIG. 11 illustrates a schematic perspective view of a finely-machined workpiece 200. With reference to FIG. 11, the roughly machined workpiece 200 of FIG. 10 may be further finely machined. In one embodiment, the plurality of roughly machined blades 204 of the workpiece 200 of FIG. 10 may be further finely machined for example by an EDM (Electrical Discharge Machining) process. Similarly, in order to clearly show the plurality of curved pockets 202 and the plurality of formed blades 204 in the workpiece 200 after finely-machined, a portion of a shroud 207 of the workpiece 200 is removed.

The machining system 100 of the present disclosure can machine curved pockets or curved holes 202 having high curvatures or complex geometries in the workpiece 200.

While the disclosure has been illustrated and described in typical embodiments, it is not intended to be limited to the details shown, since various modifications and substitutions can be made without departing in any way from the spirit of the present disclosure. As such, further modifications and equivalents of the disclosure herein disclosed may occur to persons skilled in the art using no more than routine experimentation, and all such modifications and equivalents are believed to be within the spirit and scope of the disclosure as defined by the following claims.

What is claimed is:
1. A machining apparatus, comprising:
a curved outer conduit having a cavity and a fluid inlet in fluid communication with the cavity, the curved outer conduit having a length and being flexible along the entire length;
a curved rotary electrode that is at least partially enclosed by the curved outer conduit, the curved rotary electrode comprising:
a solid flexible shaft having a first end and a second end at opposite extremities of the solid flexible shaft and a center located equidistant from the first end and the second end, the first end and the second end positioned entirely within the cavity, wherein the solid flexible shaft is disposed within the curved outer conduit and arranged so as to allow fluid to flow around the solid flexible shaft and not within the solid flexible shaft; and
a machining head located near the first end of the solid flexible shaft and having a fluid outlet in fluid communication with the cavity, the machining head electrically isolated from the curved outer conduit, and powered via the solid flexible shaft;
a first shaft coupling that electrically couples the machining head to the first end of the solid flexible shaft;
a second shaft coupling that communicates with a driving motor at the second end of the solid flexible shaft for driving the solid flexible shaft to rotate;
a first bearing located within the cavity, coupled to the curved outer conduit and in rotatable contact with the first shaft coupling; and
a second bearing located within the cavity, the second bearing being coupled to the curved outer conduit and in rotatable contact with the second shaft coupling;
wherein the first shaft coupling comprises a fluid passage in fluid communication with the fluid outlet and the cavity;
wherein the second shaft coupling is electrically coupled to one or more positioned carbon brushes;
wherein the curved outer conduit and curved rotary electrode are configured to machine a curved pocket within a workpiece, the curved pocket having a curvature, the curved outer conduit and curved rotary electrode conforming to the curvature.
2. The machining apparatus of claim 1, wherein the machining head is located outside the curved outer conduit.
3. The machining apparatus of claim 2, wherein the machining head is detachably coupled with the first shaft coupling by a threaded connection.
4. The machining apparatus of claim 2, wherein the first bearing is a sealed bearing for inhibiting fluid from flowing across it.
5. A machining system, comprising:
a machining apparatus, comprising:
a curved outer conduit having a cavity and a fluid inlet in fluid communication with the cavity, the curved outer conduit having a length and being flexible along the entire length;
a curved rotary electrode that is at least partially enclosed by the curved outer conduit, the curved rotary electrode comprising:
a solid flexible shaft having a first end and a second end at opposite extremities of the solid flexible shaft and a center located equidistant from the first end and the second end, the first end and the second end positioned entirely within the cavity, wherein the solid flexible shaft is disposed within the curved outer conduit and arranged so as to allow fluid to flow around the solid flexible shaft and not within the solid flexible shaft; and a machining head located near the first end of the solid flexible shaft and having a fluid outlet in fluid communication with the cavity, the machining head electrically isolated from the curved outer conduit, and powered via the solid flexible shaft;

a first shaft coupling that electrically couples the machining head to the first end of the solid flexible shaft;

a second shaft coupling that communicates with a driving motor at the second end of the solid flexible shaft for driving the solid flexible shaft to rotate;

a first bearing located within the cavity, coupled to the curved outer conduit, and in rotatable contact with the first shaft coupling; and a second bearing located within the cavity, the second bearing being coupled to the curved outer conduit and in rotatable contact with the second shaft coupling;

wherein the first shaft coupling comprises a fluid passage in fluid communication with the fluid outlet and the cavity;

wherein the second shaft coupling is electrically coupled to one or more positioned carbon brushes;

a power supply for powering the solid flexible shaft of the curved rotary electrode;

an electrolyte supply for providing electrolyte to the fluid inlet; and a machine tool, wherein the curved outer conduit and the driving motor are positioned on the machine tool;

wherein the fluid inlet is formed in an end of the curved outer conduit that is positioned adjacent the second end of the solid flexible shaft;

wherein the curved outer conduit and curved rotary electrode are configured to machine a curved pocket within a workpiece, the curved pocket having a curvature, the curved outer conduit and curved rotary electrode conforming to the curvature.

6. The machining system of claim 5, wherein the machining head is located outside the curved outer conduit.

7. The machining system of claim 6, wherein the machining head is detachably coupled with the first shaft coupling by a threaded connection.

8. The machining system of claim 5, wherein the first bearing is a sealed bearing for inhibiting fluid from flowing across it.

9. The machining system of claim 5, wherein the one or more positioned carbon brushes are electrically connected to the power supply via one or more electrical wires, wherein the second shaft coupling contacts rotatably and electrically with the one or more positioned carbon brushes.

10. The machining system of claim 5, wherein the machining apparatus is an electro-chemical discharge machining apparatus.

11. The machining system of claim 10, wherein the electrolyte is provided to a gap between the machining head and the workpiece via the fluid inlet, the cavity and the fluid outlet.

12. The machining system of claim 10, wherein the electrolyte is circulated through a radial gap between the machined curved pocket of the workpiece and the machining apparatus from the fluid inlet, the cavity and the fluid outlet during machining of the workpiece.

13. The machining system of claim 12, further comprising: a filter for filtering from electrolyte debris generated during the machining, wherein the filtered electrolyte is returned to the electrolyte supply.

14. The machining apparatus of claim 1, wherein the solid flexible shaft has a constantly equal outer diameter from the first end to the second end.

15. The machining apparatus of claim 1, wherein the first bearing is located between the machining head and the center of the solid flexible shaft.

16. The machining apparatus of claim 1, wherein the curved outer conduit is arranged in a shape during machining, and keeps the shape during machining.

17. The machining apparatus of claim 1, wherein the curved outer conduit is constructed of an insulating material.

18. The machining apparatus of claim 1, wherein the machining head is configured to selectively emit a spark.

19. The machining system of claim 5, wherein the curved outer conduit is arranged in a shape during machining, and keeps the shape during machining.

20. The machining system of claim 5, wherein the curved outer conduit is constructed of an insulating material.

* * * * *